(12) United States Patent
Mochizuki et al.

(10) Patent No.: US 6,820,851 B2
(45) Date of Patent: Nov. 23, 2004

(54) SEAT SLIDE

(75) Inventors: Noboru Mochizuki, Kosai (JP);
Takashi Saito, Kosai (JP)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 226 days.

(21) Appl. No.: 09/996,046

(22) Filed: Nov. 28, 2001

(65) Prior Publication Data

US 2002/0070594 A1 Jun. 13, 2002

(30) Foreign Application Priority Data

Nov. 30, 2000 (JP) ................................. P2000-365711

(51) Int. Cl.⁷ ............................................. F16M 13/00
(52) U.S. Cl. ................................................... 248/429
(58) Field of Search ............................ 248/429, 430, 248/424, 423; 296/64, 65.1, 68.1; 297/344.1, 463.1

(56) References Cited

U.S. PATENT DOCUMENTS

| 4,645,159 A | * | 2/1987 | Terada et al. ............... 248/429 |
| 4,805,866 A | * | 2/1989 | Aihara et al. ............... 248/429 |
| 5,048,786 A | * | 9/1991 | Tanaka et al. .............. 248/429 |
| 5,150,872 A | * | 9/1992 | Isomura ...................... 248/429 |
| 5,273,242 A | * | 12/1993 | Mouri et al. ................ 248/429 |
| 5,342,013 A | * | 8/1994 | Ito et al. ..................... 248/429 |
| 5,476,326 A | * | 12/1995 | Ueno et al. ................. 384/125 |
| 5,516,071 A | * | 5/1996 | Miyauchi .................... 248/429 |
| 5,762,309 A | * | 6/1998 | Zhou et al. ................. 248/429 |
| 5,829,727 A | * | 11/1998 | Chinomi et al. ............ 248/429 |
| 6,220,642 B1 | * | 4/2001 | Ito et al. .................. 296/65.14 |
| 6,244,660 B1 | * | 6/2001 | Yoshimatsu .............. 297/344.1 |
| 6,499,712 B1 | * | 12/2002 | Clark et al. ................ 248/429 |

FOREIGN PATENT DOCUMENTS

| JP | 60-078835 | 5/1985 |
| JP | 63-105536 | 7/1988 |
| JP | 05-330367 | 8/1994 |
| JP | 09-002109 | 1/1997 |

* cited by examiner

Primary Examiner—Ramon O. Ramirez
Assistant Examiner—Kofi Schulterbrandt
(74) Attorney, Agent, or Firm—Brenda O. Holmes; Kilpatrick Stockton LLP

(57) ABSTRACT

A seat slide (E1) includes a first guide (1). The seat slide includes a second guide (2) configured to be guided by the first guide (1). The second guide (2) supports a seat (101). The seat slide includes a leading member (3) configured to move the second guide (2) relative to the first guide (1). The seat slide includes a cap (4) mounted to the second guide (2). The cap includes a first support (41) for supporting the leading member (3). The cap includes a second support (42) extending from the first support (42) for supporting the second guide (2).

7 Claims, 10 Drawing Sheets

SEAT SLIDE

BACKGROUND OF THE INVENTION

The present invention relates to a seat slide adapted for a vehicle, wherein a seat is movable without physical human power.

A seat slide is known, wherein the rotational drive of a lead screw located in an upper rail causes the upper rail to be moved relative to a lower rail for movement of the seat supported to the upper rail in the longitudinal direction of a vehicle.

The upper rail is configured in a U-shape in section, for example, by pressing. The lead screw extends coaxially with the upper rail. The end of the upper rail is provided with an end cap serving as the bearing for the end of the lead screw.

The end cap includes a guide wall projecting along the inner face of the upper rail and abutting on the inner face; and a bearing rotatably supporting the end of the lead screw.

SUMMARY OF THE INVENTION

In the above seat slide, however, the mating of the guide wall identical in shape with the inner face of the upper rail allows the end cap to be retained at a predetermined position and preventing tottering, as is preferable. The mating of portions with each other, however, still requires a high predetermined mating positional accuracy. In other words, the range of both components of necessary dimension control accuracy to maintain in mating is large, and the burden of necessary quality control is large, thus reducing productive efficiency as a whole.

An object is to provide a seat slide wherein the range for dimensional control of the portions of an end cap and upper rail when mating with each other is reduced to improve productive efficiency.

The invention provides a seat slide. The seat slide includes a first guide. The seat slide includes a second guide configured to be guided by the first guide. The second guide supports a seat. The seat slide includes a leading member configured to move the second guide relative to the first guide. The seat slide includes a cap mounted to the second guide. The cap includes a first support for supporting the leading member. The cap includes a second support extending from the first support for supporting the second guide.

The first and second guides preferably are adapted to a slide-type or a roller-type.

Preferably, the cap covers an end of the second guide.

Preferably, second supports extend symmetrically relative to the first support.

Preferably, the cap includes a first wall facing the end of the second guide. The first wall is formed as a unit with one of the first and second supports.

Preferably, the second guide includes a first locking part. The cap includes a second wall extending from the first wall. The second wall includes a second locking part locked with the first locking part. This includes both of variations that the first locking part includes an opening, while the second locking part includes a projection and that the first locking part includes a projection, while the second locking part includes an opening. The second wall is preferably located inside or outside the first guide.

Preferably, the cap is molded of a resin. The resin includes, for example, polypropylene.

According to the invention, the abutment of the second support on the second guide causes the restriction of the second guide from tottering relative to the cap. Thus, the first support is retained at a predetermined position for supporting the leading member. At this time, the mating of the second guide with the cap is performed within a considerably short range of the end of the second support. This allows the range necessary for mating dimension control to be considerably narrowed. Thus, production efficiency is improved, without necessity of the accurate dimension control over long range.

Even if projections such as burr occurred when the projections were positioned so as not to correspond with the end of the second support, the cap was mounted to the second guide, without modification of the second guide. Thus, in this respect, production efficiency is improved.

In addition, the formation of the second support extending from the first support allows the first support to be reinforced by the second support. Thus, the first support is reduced in thickness, allowing it to be light-weight and reducing productive costs.

The unitary formation of the first wall with one of the first and second supports as a unit allows the first wall to be reinforced. Thus, the first wall is reduced in thickness, allowing it to be light-weight and reducing production costs. In addition, the reinforcement of the first wall allows the second wall extending from the first wall to be reliably supported. Thus, cap is prevented from dropping off and out of the second guide.

The unitary molding of the cap allows the cap to be produced in a short time in large quantities and at a low cost. In addition, the reinforcement of the first support and the first wall provides sufficient strength, even when using a widely used resin. Thus, the productive cost was is reduced.

BRIEF DESCRIPTION OF THE ACCOMPANYING DRAWINGS

DETAILED DESCRIPTION OF THE PREFERRED EMBODIMENTS

An embodiment of the present invention will hereby be explained with reference to the drawings of FIGS. 1 to 10.

Figure 1:
FIG. 1 is a perspective view of a seat to which an embodiment of a seat slide according to the invention is adapted.
Figure 2:
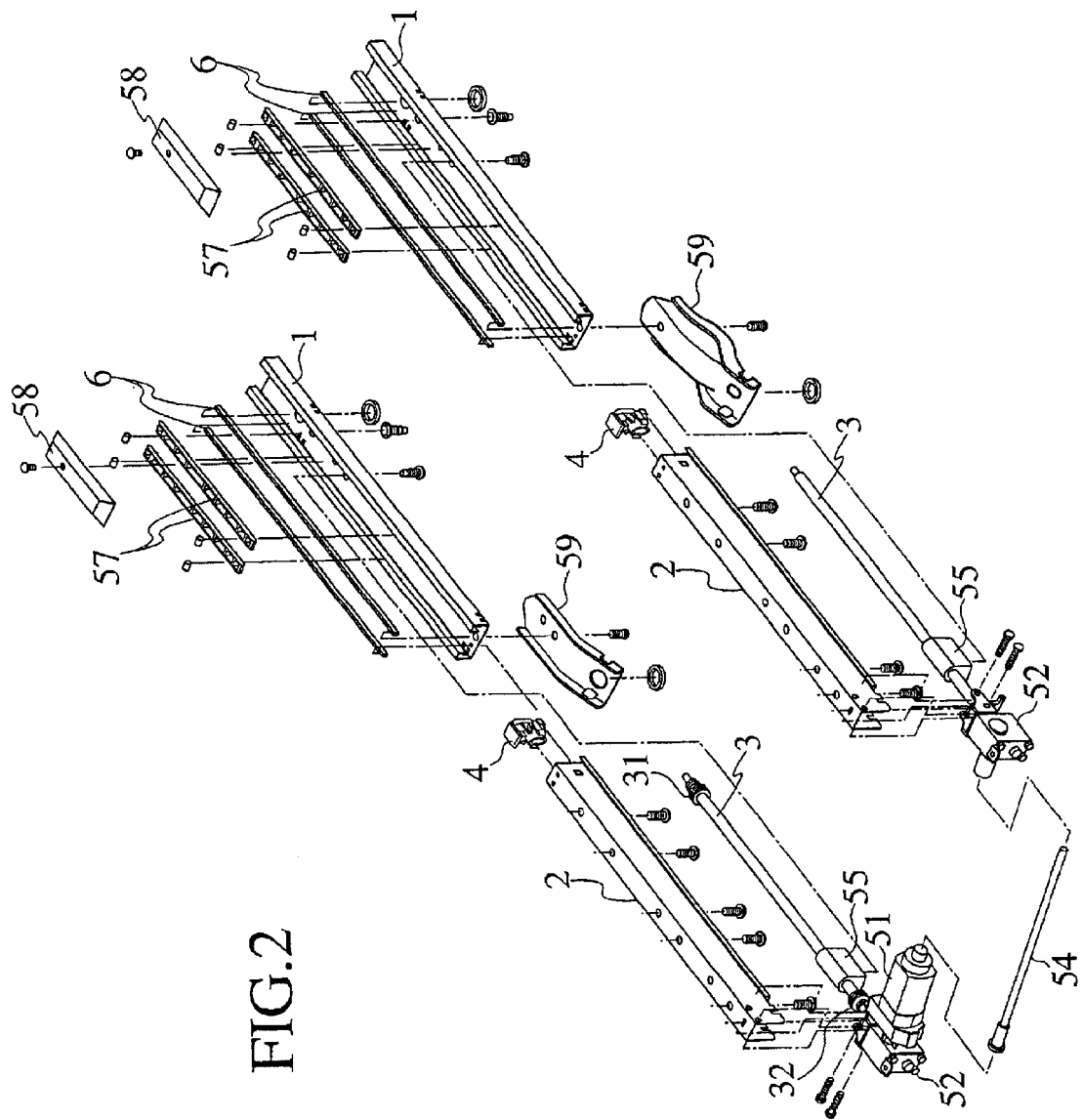
FIG. 2 is an exploded perspective view of the embodiment of the seat slide in FIG. 1.

As shown in FIG. 1, the seat slide E1 is adapted for a seat 101 of a vehicle such as an automobile. The seat slide as shown in FIG. 2, includes a pair of slide mechanisms 1 and 2 facing each other. The seat slide includes an electric motor 51. The seat slide includes a transmission mechanism 51 to 55 and 3 mounted between the motor and the slide mechanisms. The transmission mechanism includes a flexible wire 54 connecting between the motor and gear boxes 52.

A slide mechanism, represented by the embodiment, includes lower rail 1, as a fist guide, fixed to the floor of a vehicle, using leg 59. The slide mechanism includes upper rails 2, as a second guide, movable to lower rails 1, which support a seat 101 of an automobile. The transmission mechanism includes lead screw 3, as a leading member, for moving and driving upper rail 2 relative to lower rail 1. The seat slide includes end caps 4, as a cap, provided to at least one end of upper rail 2, which serves as a bearing for the end of lead screw 3. End cap 4 includes tubular bearing part 41, as a first support, for receiving the end of lead screw 3. End cap 4 includes rib parts 42, as a second support, extending from the bearing part 41 toward the inner face 2a of upper rail 2.

Bearing part 41 and rib parts 42 of end cap 4 are formed as a unit with front wall 43, as a first wall, covering the end face of upper rail 2. In addition, front wall 43 has upper arm (arm part) 44, as a second wall, formed as a unit thereto, which extends along the outer face of the upper wall (wall part) of upper rail 2. Front wall 43 has side arms (arm part) 45, as a second wall, provided thereto, which extend along respective inner faces 2a of horizontal side walls (wall part) 22. Upper arm 44 has locking projections 44a formed upper wall 21 of upper rail 2, which are locked with locking hole 21a to prevent end cap 4 from dropping off and out of upper rail 2. On the other hand, side arms 45 each have locking projection 45a provided thereto, which is locked with locking hole 22a formed on the side wall 22 of upper rail 2 for the prevention of end cap 4 from dropping off and out of upper rail 2. End cap 4 is unitarily molded of a widely used resin such as polypropylene (pp).

Figure 4:
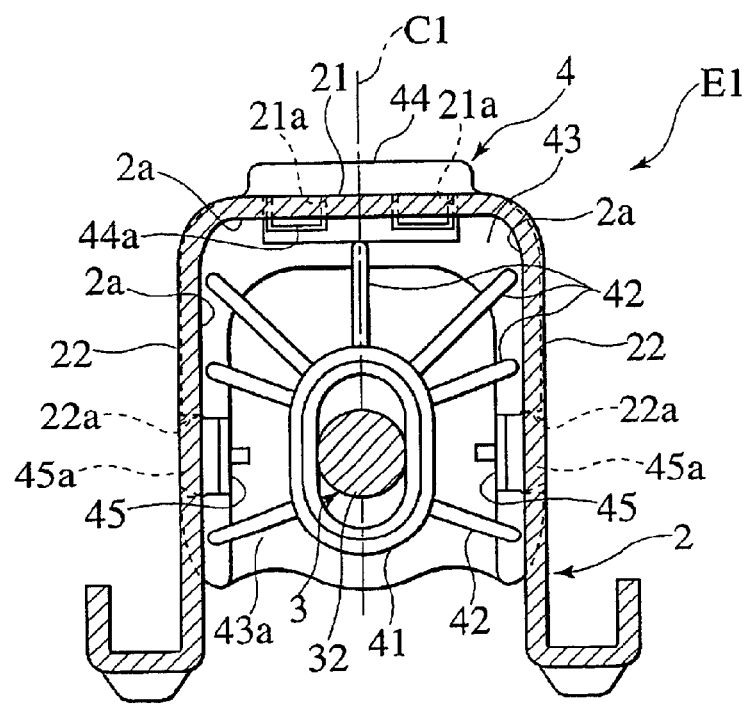
FIG. 4 is a sectional view of an embodiment of the seat slide according to the invention.
Figure 5:
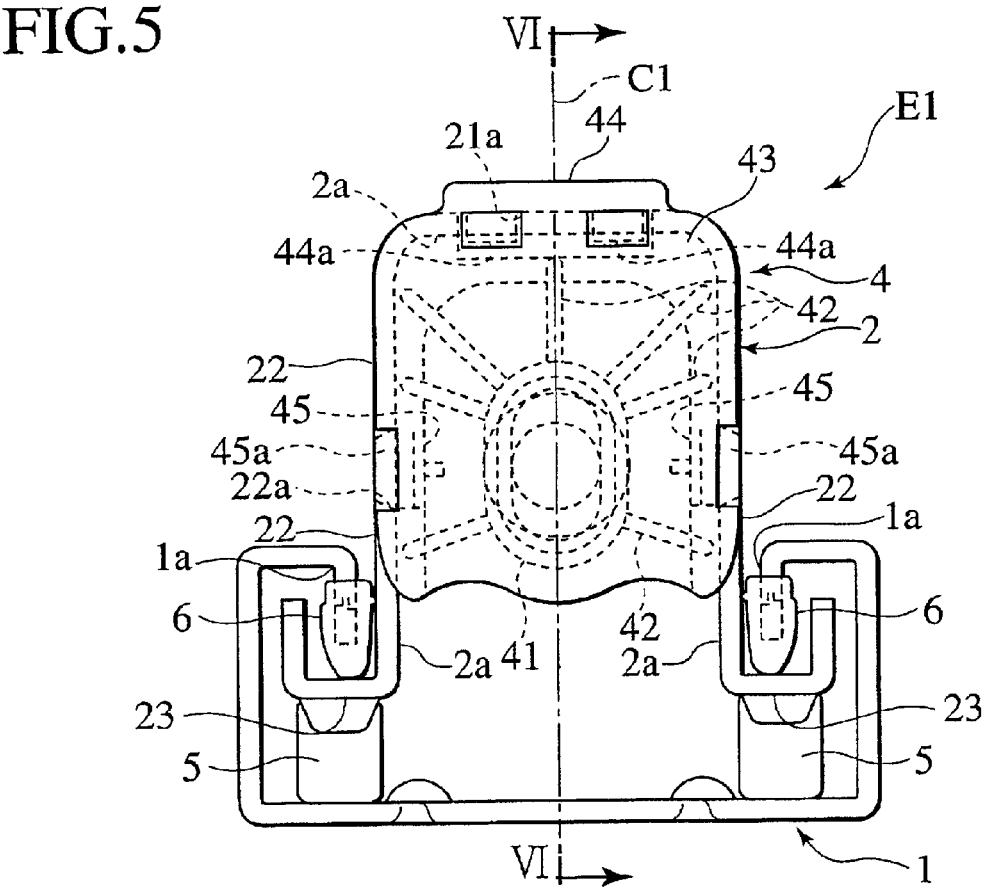
FIG. 5 is a front view of the seat slide.
Figure 6:
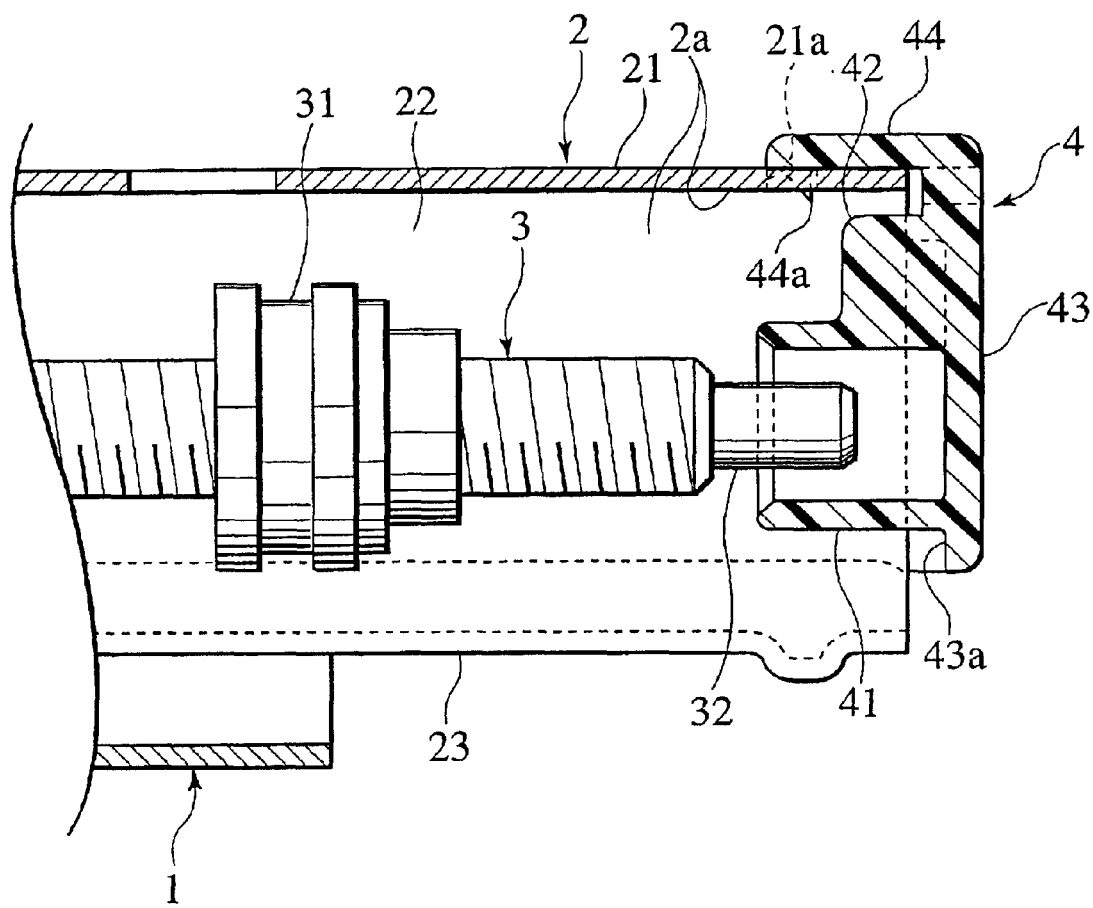
FIG. 6 is a sectional view of the primary part of the seat slide, taken along III—III line of FIG. 2.
Figure 7:
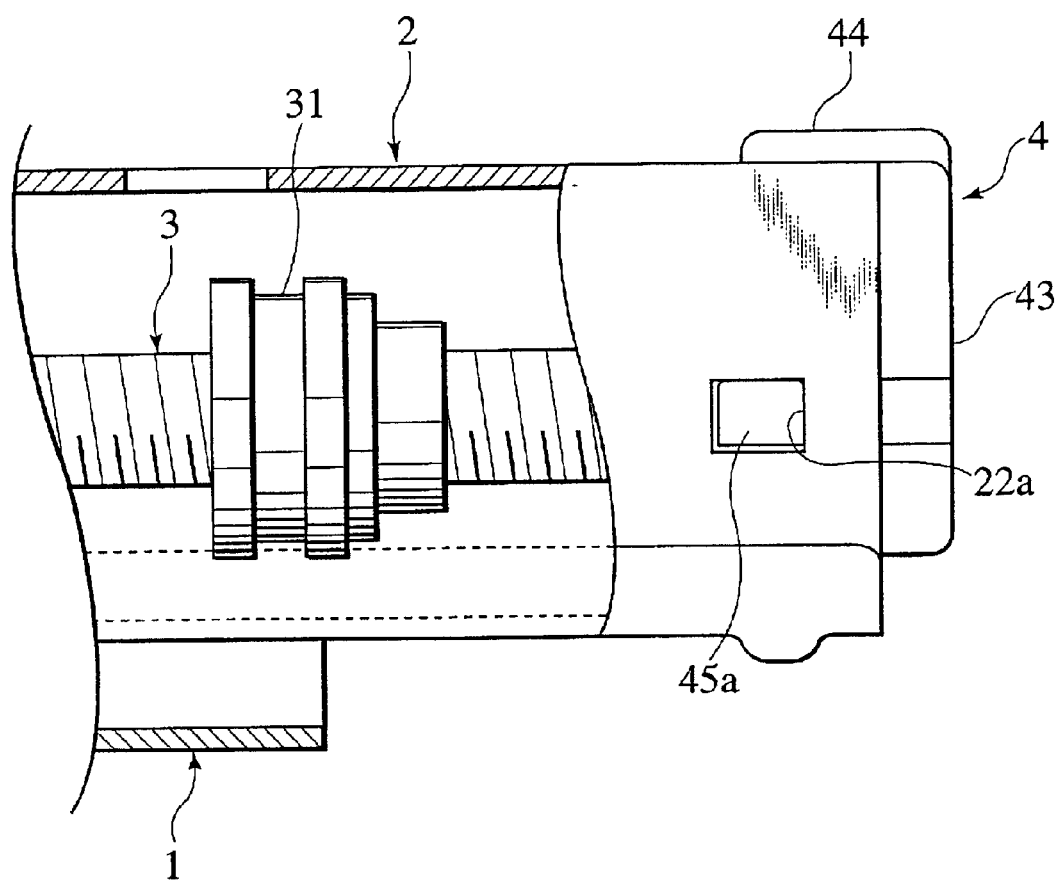
FIG. 7 is a partial sectional view of the primary part of the seat slide.
Figure 8:
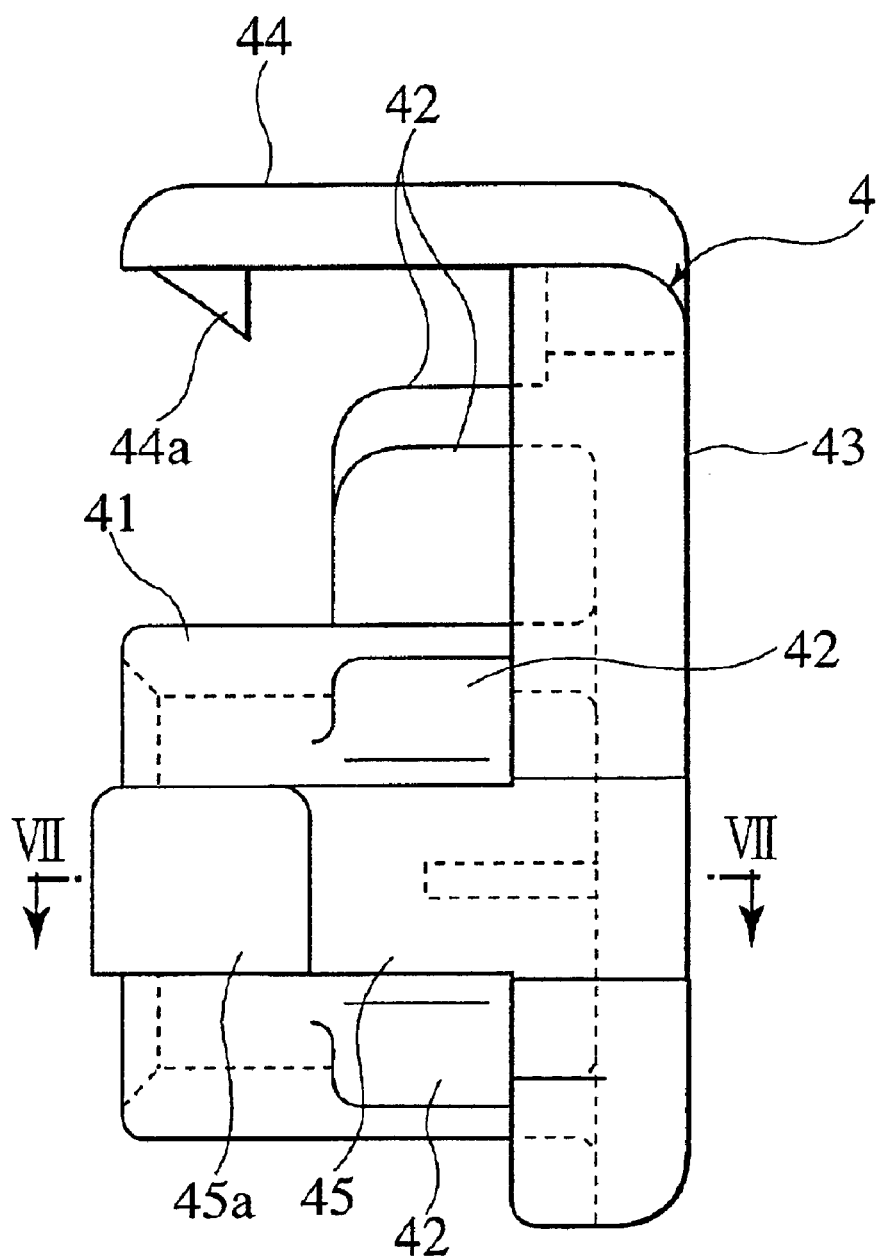
FIG. 8 is an elevation view showing the end cap of the seat slide.
Figure 9:
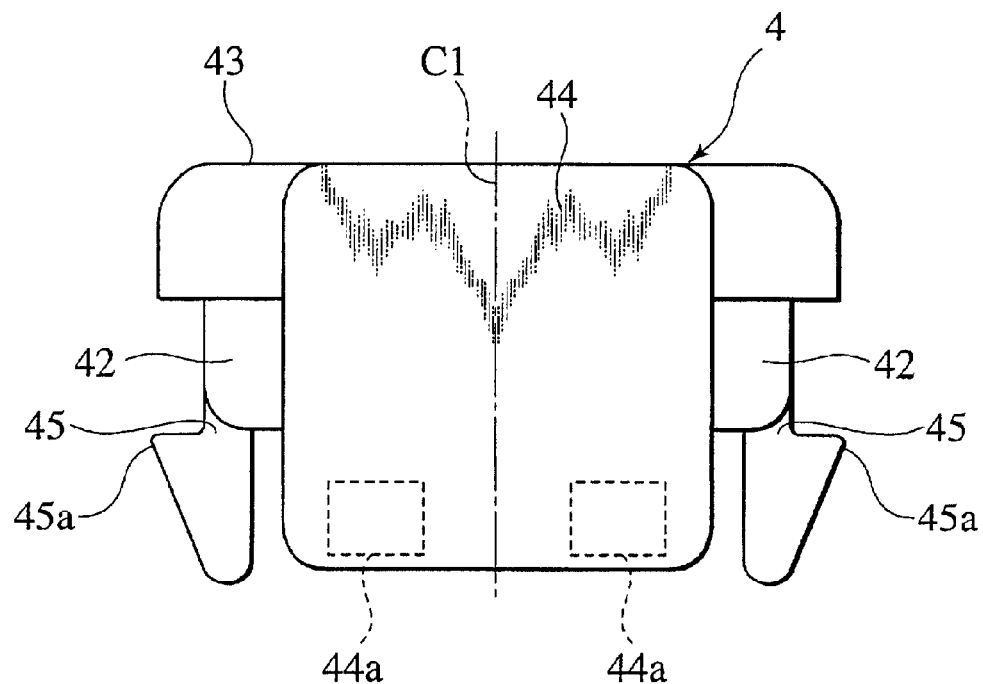
FIG. 9 is a plane view showing the end cap of the seat slide.
Figure 10:
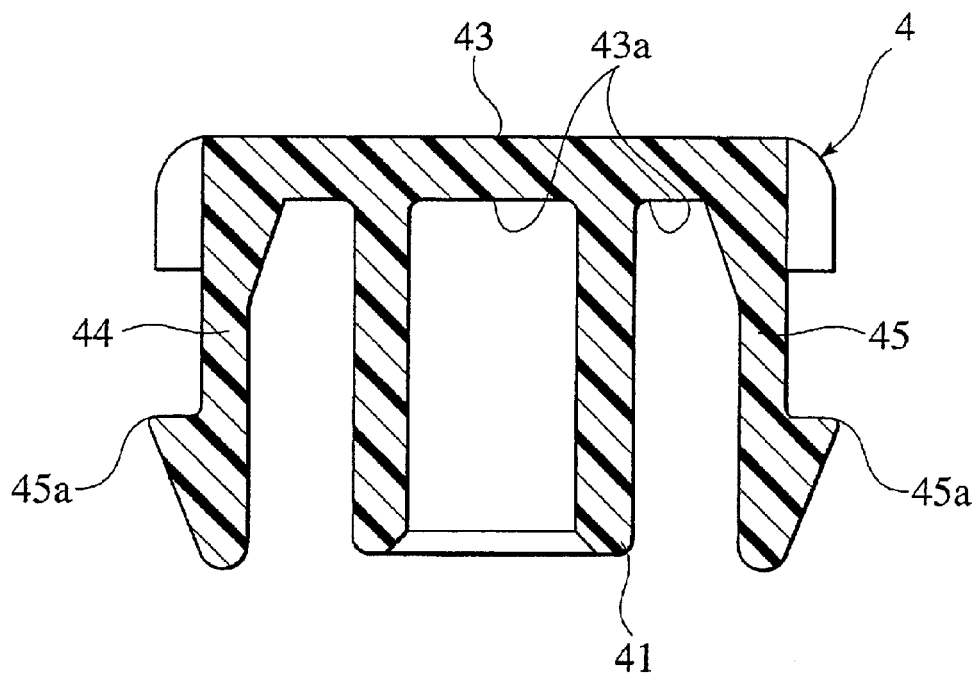
FIG. 10 is a sectional view of the end cap of the seat slide, taken along VII—VII line in FIG. 5.

Hereinafter the above-constitution is explained in further detail. Lower rail 1, as shown in FIGS. 4 and 5, supports horizontal legs 23 of upper rail 2 to be axially moved along straight extending roller bearings 5, which are retained by retainers 57 shown in FIG. 2. In FIG. 5, resin-made sliders 6 are provided to horizontal arms 1a of lower rail 1 for the slidable pressure of legs 23 of upper rail 2 on the slider 5 from the above and for the slidable pressure of horizontal side walls 22 of upper rail 2 from the outside thereof. These allow upper rail 2 to be axially moved without the separation from lower rail 1.

Figure 3A:
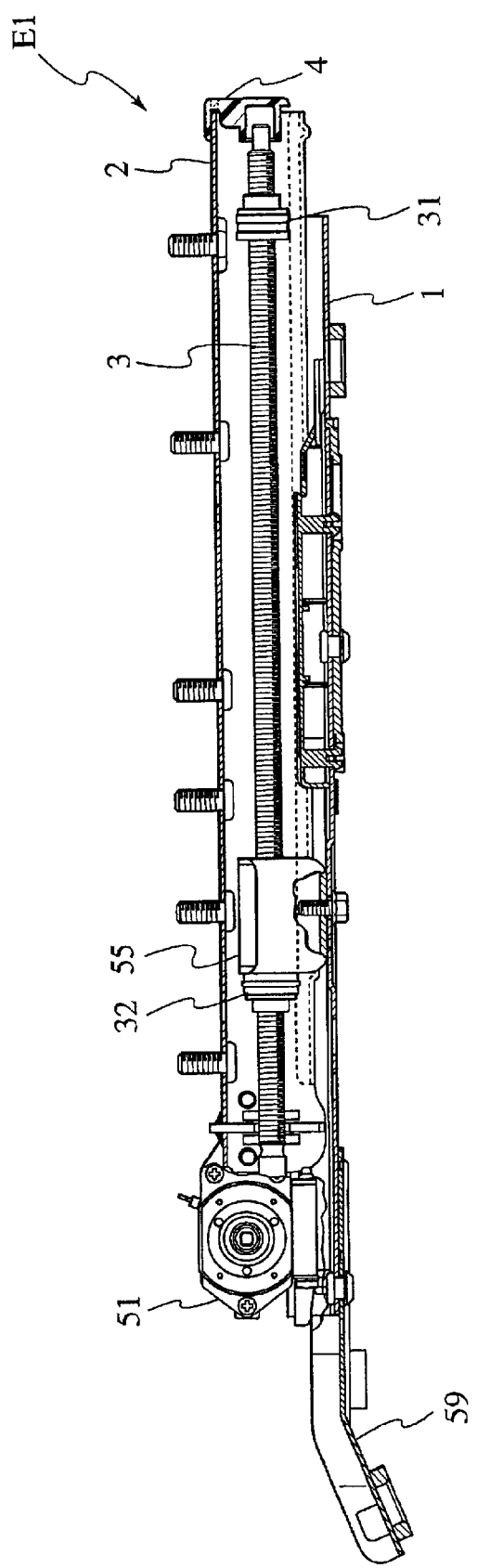
FIG. 3A is a partially exploded front view of the embodiment of the seat slide.

The top face of lower rail 1 has nut 55 fixed thereon, which is screwed in by lead screw 3, as shown in FIGS. 2 and 3A.

Figure 3B:
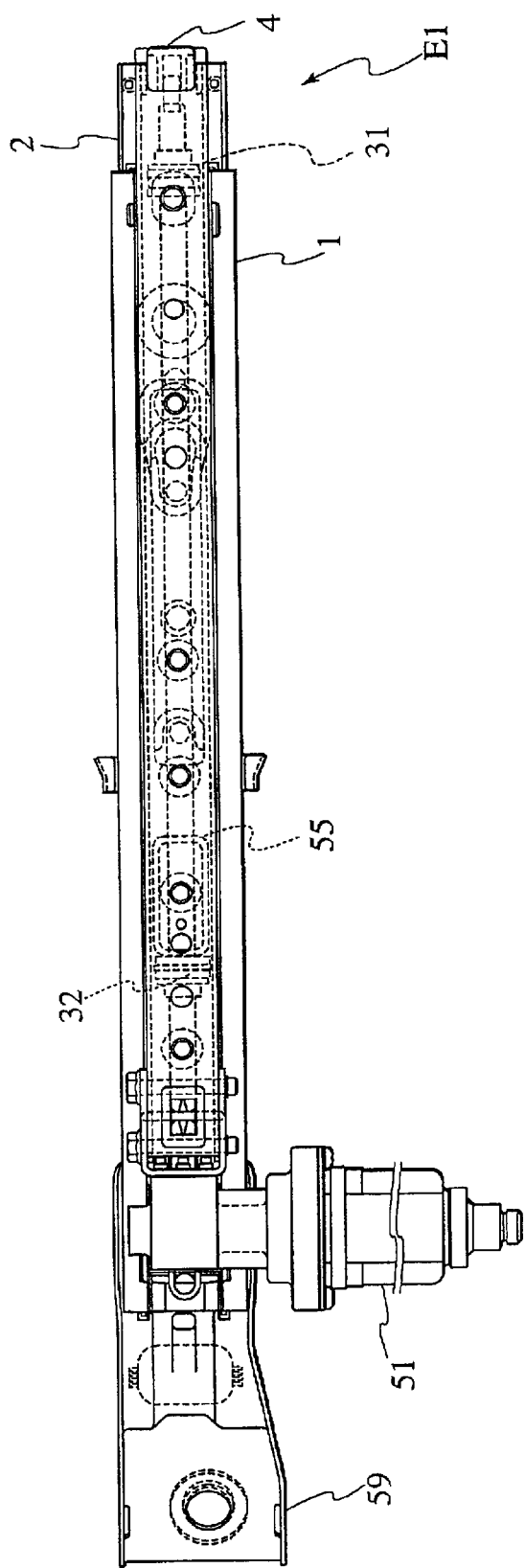
FIG. 3B is a plane view of the embodiment of the seat slide.
Figure 3C:
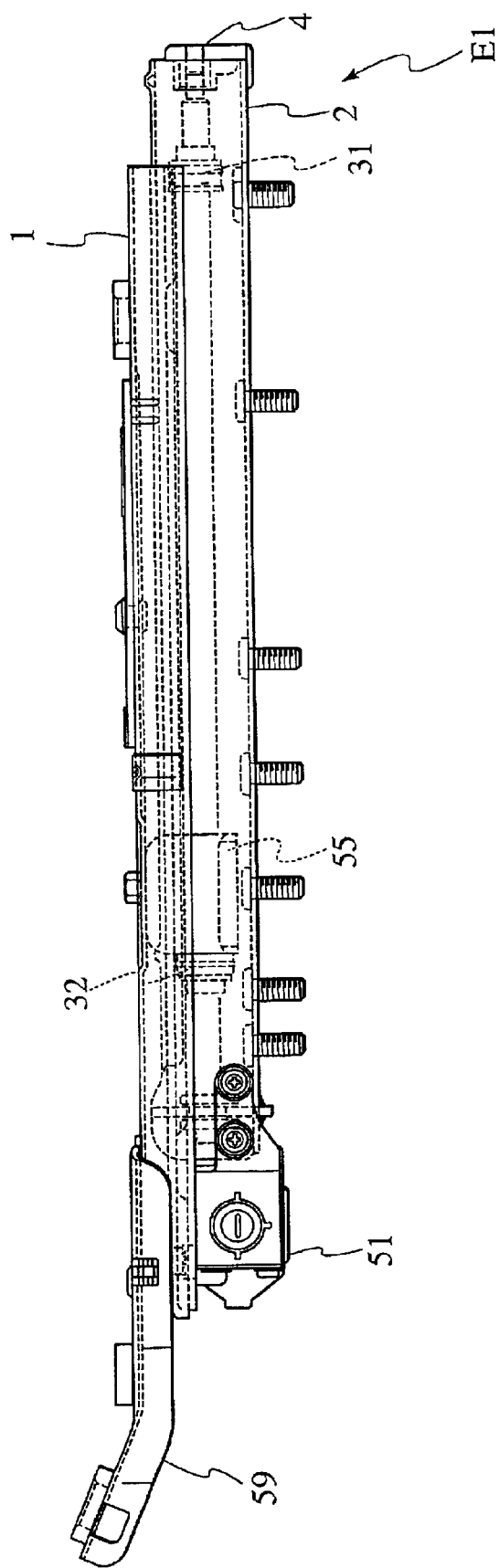
FIG. 3C is a rear side view of the embodiment of the seat slide.

Lead screw 3 is rotatably supported to upper rail 2. The proximal end thereof is rotatably driven by electric motor 51 provided to upper rail 2, as shown in FIGS. 2, 3A, and 3B. The distal end thereof includes shaft part 32 with a shorter radius radially shortened and a circular shape in section. The shaft part 32 is rotatably supported by bearing part 41 of end cap 4. In addition, the proximal and distal ends of lead screw 3 have stoppers 31 ,32 provided thereto, as shown in FIG. 2. The distal end of lead screw 3 corresponds with the direction of the rear of the automobile.

The primary part of upper rail 2 is formed of upper wall 21 and horizontal side walls 22 in a U-shape in section, with the above-described legs 23 each formed axially along side wall 22. Such an upper rail structure 2 is unitarily formed by pressing. The above-described locking holes 21a are stamped out as a rectangular through-hole. Locking holes 21a are positioned horizontal symmetry about the center line C1 which divides the section of upper rail 2 in two parts. Respective locking holes 22a also are positioned in horizontal symmetry about center line C1 which divides the upper rail 2 in two parts in section.

Bearing part 41 of end cap 4 is configured as a vertically elongated-circular tube. Bearing part 41 has a horizontal spacing (perpendicular to side walls 22) between the inner faces thereof slightly larger than the size of shaft part 32, the width of which reliably prevents the horizontal shifting of the end of lead screw 3. The vertical spacing between the inner faces of bearing part 41 is one and a half to twice as large as the size of shaft 32, thus allowing vertical movement of the end of lead screw 3.

In the embodiment, bearing part 41, as shown in FIG. 4, is configured in an elongated circular shape. This is preferably configured in a circular shape, according to the changes in the layout of the rail.

Respective rib parts 42 extend radially from the outer peripheral face of bearing part 41 toward the inner face 2a of upper wall 21 and toward inner faces 2a of horizontal side faces 22. The respective ends of the ribs are formed close to respective inner faces 2a at a predetermined clearance distance. Respective rib parts 42 are positioned in horizontal symmetry about the center line C1. The stable abutment of the ribs on inner faces 2a of upper rail 2 prevents the tottering of the end cap relative to the upper rail 2. While one rib part 42 engages with the inner face 2a of upper wall 21, three rib parts 42 engage with each of the inner faces 2a of side walls 22 respectively, thus allowing the horizontal force applied by lead screw 3 to be received with sufficient strength.

In addition, front wall 43 is formed with and reduced in thickness by cut-out portions 43a both within and encompassing the bearing part 41, reducing in thickness.

In the seat slide E1, when end cap 4 is mounted to the end of upper rail 2, with upper arm 44 along the outer face of upper wall 21 and with side arms 45 along the inner faces 2a of side walls 22 respectively, and with the ends of rib parts 42 abutted on the inner faces 2a of upper rail 2, rib part 42 is pushed into upper rail 2. This causes the front wall 43 to be brought into contact with the end of upper rail 2, At which time, locking projections 44a, 45a engage with locking holes 21a, 22a, respectively, thus allowing end cap 4 to be fixed to upper rail 2. At this time, the ends of rib parts 42 and the inner faces upper rail 2 come close to each other with a predetermined clearance distance, respectively, thus allowing the engagement with the inner faces of upper rail 2. This allows bearing part 41 to be fixed in a position of upper rail 2 in section, with the shaft 32 of lead screw 3 retained. Specifically, in the embodiment, shaft part 41 is centered horizontally of upper rail 2, being located coaxially to lead screw 3.

Thus, pushing end cap 4 in the end of upper rail 4 causes the end of upper rail 2 to be easily covered by the end cap 4 and the end of lead screw 3 to be reliably retained by the bearing part 41.

The mating of upper rail 2 and end cap 4 is performed within the considerably short range of the end of each rib part 42. The mating allows the range necessary for dimension control to be considerably narrowed. Thus, production efficiency is improved.

For example, even if projections such as burr occur, with the projections positioned so as not to contact with any ends of rib parts 42, the end cap 4 is mated with upper rail 2, without the removal of the projections. Thus, in this respect, production efficiency is improved.

In addition, rib parts 42 extending from bearing part 41 allow the reinforcement of bearing parts 41 by rib parts 42. Thus, tubular bearing part 41 is reduced in thickness, thus allowing it to be light-weight and reducing in production costs. The variation in the number and extension direction of rib parts 42 has the advantage of collective reinforcement of the portion where a specific large force acts.

On the other hand, the reinforcement of front wall 43 by rib parts 42 allows it to be light-weight, reducing in thickness and production costs. The reinforcement of front wall 43 allows the retention strength of the upper arm extending from the front wall 43 and side arms 45 to be improved. Thus, using locking projections 44a, 45a, end cap 4 is reliably fixed to upper rail 2.

The unitary formation of end cap 4 with resin enables end cap 4 to be produced in a short time in large quantities and at a low price by injection molding. In addition, the reinforcement of the whole of end cap 4 by rib parts 42 provides sufficient strength, even when using a widely used resin such as polypropylene. Thus, the productive cost is reduced.

The entire contents of Japanese Patent Applications P2000-365711 (filed on Nov. 30, 2000) is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A seat slide comprising:

a first guide;

a second guide configured to be guided by the first guide to slide a seat, the second guide including a first locking part;

a leading member configured to move the second guide relative to the first guide;

a cap mounted to the second guide, the cap comprising:

a first support inserted into the inside of the second guide and supporting the leading member; and a second support extending from the first support toward the second guide for supporting the second guide, said second support having a distal end;

a first wall facing an end of the second guide, the first wall being formed as a unit with one of the first and second supports; and a second wall extending from the first wall, the second wall including a second locking part locked with the first locking part, wherein the distal end of the second support and the second guide are positioned in proximity to each other, thereby defining a gap between the distal end and the second guide wherein the first locking part has a hole, and the second locking part includes a projection inserted in the hole.

2. The seat slide according to claim 1, wherein the cap covers an end of the second guide.

3. The seat slide according to claim 1, wherein the second support includes a plurality of supports extending symmetrically relative to the first support.

4. The seat slide according to claim 1, wherein the cap is integrally molded of a resin.

5. The seat slide according to claim 1, wherein the second guide includes an upper rail having an upper wall and side walls extending from the upper wall, wherein the first support includes a bearing part having an outer circumferential face, wherein the second support includes ribs extending from the outer circumferential face toward the upper wall and the side walls, wherein distal ends of the ribs and the upper and side walls are positioned in proximity to each other, defining a gap between the distal ends and the upper and side walls.

6. The seat slide according to claim 5, wherein the upper wall and the side walls include first locking parts, respectively, and wherein the cap includes second locking parts locked with the first locking parts, respectively.

7. The seat slide according to claim 1, wherein the first support has an elongated hole for inserting the leading member into the elongated hole.

* * * * *